(12) United States Patent
Cheung

(10) Patent No.: US 6,971,600 B2
(45) Date of Patent: Dec. 6, 2005

(54) OSCILLATION MECHANISM FOR FISHING REEL

(75) Inventor: Chung Cheung, Kwai Chung (HK)

(73) Assignee: Heligear Engineering (H.K.) Co., Ltd., Kwai Chung (HK)

(*) Notice: Subject to any disclaimer, the term of this patent is extended or adjusted under 35 U.S.C. 154(b) by 0 days.

(21) Appl. No.: 10/609,915

(22) Filed: Jun. 30, 2003

(65) Prior Publication Data

US 2005/0006510 A1 Jan. 13, 2005

(51) Int. Cl.[7] .......................................... A01K 89/015
(52) U.S. Cl. ..................................... 242/242; 242/277
(58) Field of Search ............................... 242/241, 242, 242/273, 277, 278

(56) References Cited

U.S. PATENT DOCUMENTS

| | | | |
|---|---|---|---|
| 5,143,318 A | * | 9/1992 | Tipton et al. ................ 242/241 |
| 5,167,381 A | * | 12/1992 | Henriksson et al. ........ 242/242 |
| 5,350,131 A | | 9/1994 | Baumgartner et al. |
| 5,364,041 A | * | 11/1994 | Hitomi ........................ 242/242 |
| 5,921,489 A | | 7/1999 | Shibata |
| 6,264,125 B1 | | 7/2001 | Cockerham et al. |

* cited by examiner

*Primary Examiner*—Emmanuel M Marcelo
(74) *Attorney, Agent, or Firm*—Alix, Yale & Ristas, LLP

(57) ABSTRACT

The invention compensates or normalizes for the non-linear oscillation speed of the spool in a fishing reel through use of a special shaped guide slot. The guide slot can be shaped through combining a number of curves into the length of the slot. In particular, for each end of the guide slot there is contained a curvature section, such that both ends of the guide slot are curving toward the spool side in one design or away from the spool in the other design. This general shape of the guide slot improves the contact position between the pole and the level wind bracket, and also compensates for the non-linear speed of the spool. The shape of the guide slot also reduces the wobbling or jiggling that occurs during operation of the reel when compared to conventionally designed reels.

4 Claims, 3 Drawing Sheets

OSCILLATION MECHANISM FOR FISHING REEL

BACKGROUND OF THE INVENTION

The present invention relates generally to fishing reels of the type having an oscillating fishing line spool. More particularly, the present invention relates to mechanisms for selectively providing an oscillating motion to elements of fishing reels in an advantageous manner.

The shape and the angle of a line which is laid onto a fishing reel spool can affect how far a bail can be thrown during casting. A good line lay shape can also prevent line jamming when retrieving and releasing fishing line.

Presently, there is a trend to increase the amount of fishing line wound onto the spool of a fishing reel. This increased storage capacity requires that the reel have a spool with dimensions that can store more fishing line, conventionally by having a spool with a longer neck and a fishing reel with a longer oscillation distance.

Typically, in a fishing reel with an oscillation mechanism there is a pole attached to an oscillation gear. An end of the pole mechanically interacts with a guide slot in a level wind bracket. The level wind bracket has a shaft fixed to it, and is moved in a linear fore and aft motion by the interaction of the pole and guide slot. A spool is attached to the shaft. The pole functions to transmit the rotary motion of the oscillation gear to a linear motion for the level wind bracket and the spool. However, the speed of the spool varies according to the different positions between the pole and the level wind bracket.

The oscillation of a fishing reel spool using the conventional level wind bracket resembles harmonic motion. This motion results in the amount of fishing line being retrieved onto a section of a spool being inversely proportional to the oscillation speed of that portion. With the simple level wind bracket the linear oscillation speed of the spool is much slower at the two ends of the spool, but is relatively faster near the middle section of the spool. This creates a situation in which the amount of fishing line retrieved and laid on the two ends will be relatively more than on the middle section of the spool. This is undesired since casting distance will be limited, and fishing line jamming will result.

SUMMARY OF THE INVENTION

Briefly stated the present invention in a preferred form is generally directed toward reducing non-uniform fishing line storage on a fishing reel spool.

The invention provides a method to compensate some of the non-linear oscillation speed of the spool through use of a special shaped guide slot. The guide slot can be shaped through combining a number of curves into the length of the slot. In particular, for each end of the guide slot there is contained a curvature section such that both ends of the guide slot are curving toward the spool side in one design or away from the spool in another design. This general shape of the guide slot improves the contact position between the pole and the level wind bracket, and also compensates for the non-linear speed of the spool. Furthermore, the shape of the guide slot reduces some of the wobbling or jiggling that occurs during operation of the reel when compared to conventionally designed reels.

An object of the invention is to provide a more efficient and trouble free fishing line laying by providing a better line releasing condition which, in addition, can effectively prevent a line from jamming as the line releases from a spool.

Another object of the invention is to reduce the friction associated with and the wobbling of a fishing reel during line retrieving to thereby reduce user fatigue while using the fishing reel.

BRIEF DESCRIPTION OF THE DRAWINGS

Other objects and advantages of the invention will be evident to one of ordinary skill in the art from the following detailed description with reference to the accompanying drawings, in which.

DETAILED DESCRIPTION OF THE PREFERRED EMBODIMENT

Figure 1:
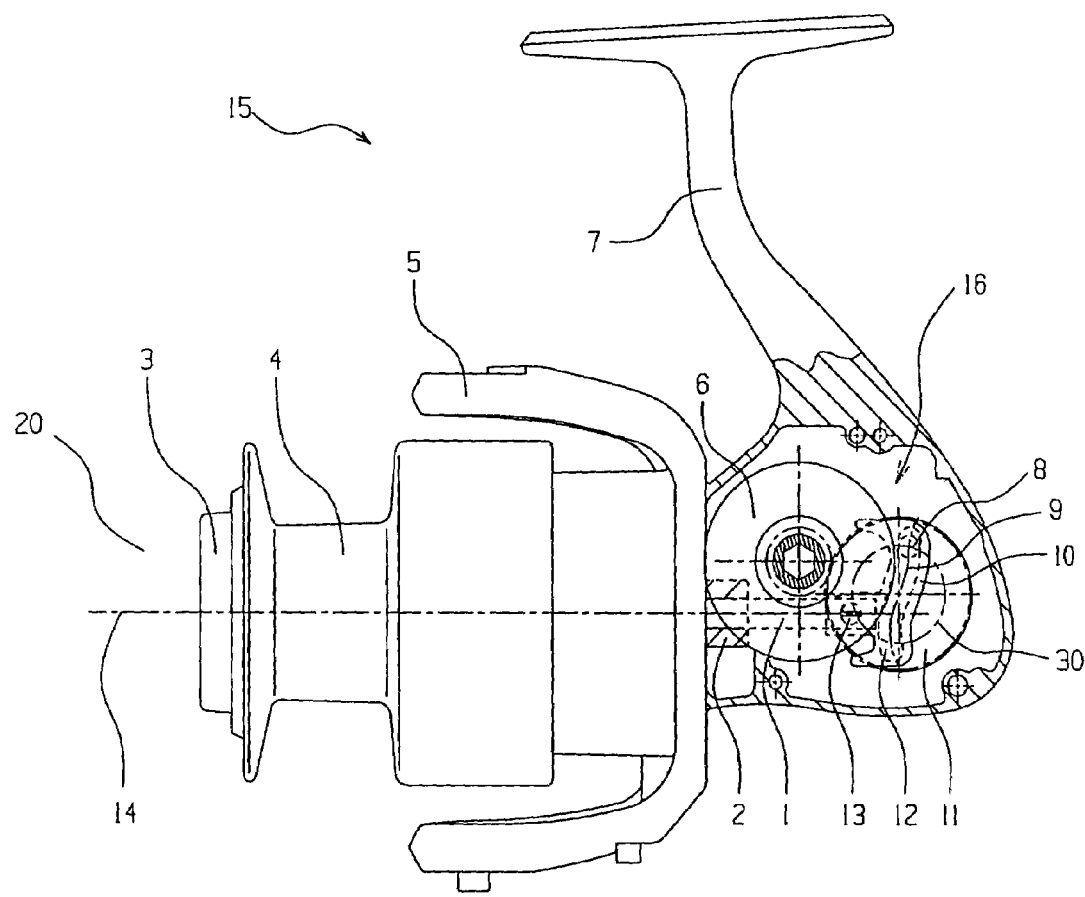
FIG. 1 is a side sectional view, partly in phantom, of a fishing reel having an oscillation mechanism in accordance with the invention.

With reference to the drawings wherein like numerals represent like parts throughout the several figures, an oscillation mechanism in accordance with the present invention is generally designated by the numeral 16.

One type of fishing reel that incorporates the invention is a spinning type fishing reel with a rotor mechanism well known in the art. A fishing reel 15 has a body 7, which encases the oscillation mechanism 16. The reel has a rotor mechanism 2 associated with it, and a spinning assembly 5. The reel 15 has a spool 4 for the storage of fishing line. The oscillation mechanism 16 has an oscillation gear 11 supported, at least in part, by the body 7 and driven by a drive gear 6. A level wind bracket 10 is located on top of or in close proximity to the oscillation gear and can be moved in a fore and an aft direction along a main shaft axis 14. The level wind bracket generally will have a shaft attachment area 13, which attaches to a shaft 1. The oscillation gear 11 and drive gear 6 may interact through such things as gear teeth, frictional surfaces or through intermediary components which allow rotational force to be transmitted.

A pole 8 is, for example, part of, attached, disposed on, or otherwise associated with the oscillation gear 11. A guide slot 12 is located in the level wind bracket 10 on the side facing the level wind gear. The slot 12 generally defines an area between the ends of the level wind bracket in a non-linear curving path. The slot may have multiple and/or complex curving surfaces along its boundaries. The pole 8 interacts with the guide slot 12 of the level wind bracket 10, and can transmit and convert the rotary motion of the oscillation gear 11 to an oscillation motion of the level wind bracket 10. The oscillation motion occurs when the level wind bracket is displaced, for instance, along the main shaft axis 14. During operation of the oscillation mechanism, the oscillation gear is rotated by the drive gear, and the pole 8 transmits this rotary motion to the level wind bracket 10 through the guide slot 12. In one embodiment of the invention, the contact point between the pole and the guide slot varies position during reel operation and the path the pole follows within the guide slot causes the spool to oscillate fore and aft in a relatively more constant speed when compared with a conventional designed guide slot.

When a force is transmitted from the pole 8 to the level wind bracket 10, the contact angle between the pole and the guide slot affects the magnitude of the force that moves the level wind bracket 10 fore and aft. The force acting on the guide slot surface from the pole can be separated into a vertical component and a horizontal component, for example as shown in FIG. 6–9. Only the horizontal component parallel to the motion of the level wind bracket is useful. The vertical component is nonproductive and causes friction and jiggle.

Figure 2:
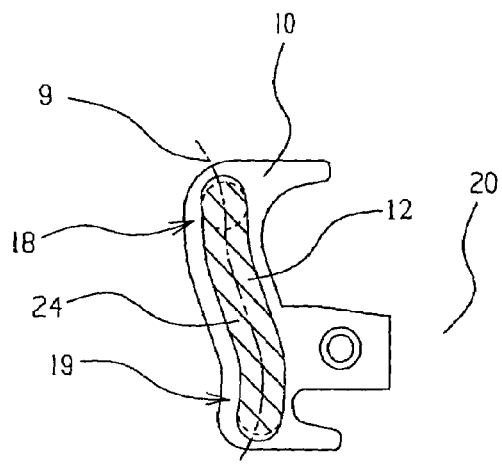
FIG. 2 is a diagrammatic perspective view of a level wind bracket.

In one embodiment of the invention, rotation of the oscillation gear causes the pole 8 to move in a substantially circular path 30, as the pole moves it interacts with the guide slot 12 thereby moving the level wind bracket. The guide slot 12 has curving configuration to compensate or normalize for some of the non-unity speed of the level wind bracket. In one embodiment of the invention for example, as in FIG. 2, the guide slot 12 has a curved configuration. The hatched area highlights a functional area 24 of the guide slot where the pole is moving and is workable within this functional area. The guide slot has a center line 9 along its length. The two functional ends 18 and 19 of the slot are of a curving shape and have an orientation such that both curve in a uniform direction away from the spool 4.

Figure 3:
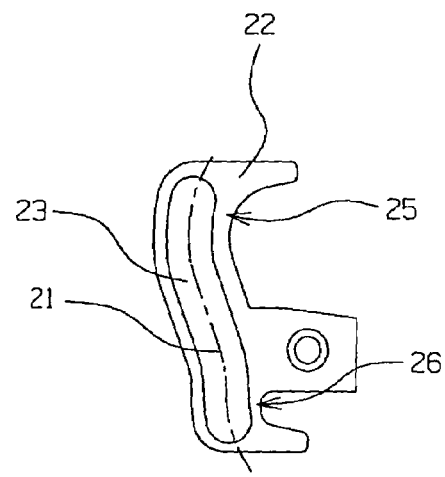
FIG. 3 is a diagrammatic perspective view of a second embodiment of a level wind bracket.

In one embodiment of the invention, for example, as in FIG. 3, the two functional ends 25 and 26 of the guide slot are in a curvature shape and are both curving in a direction toward the spool 4.

Figure 4:
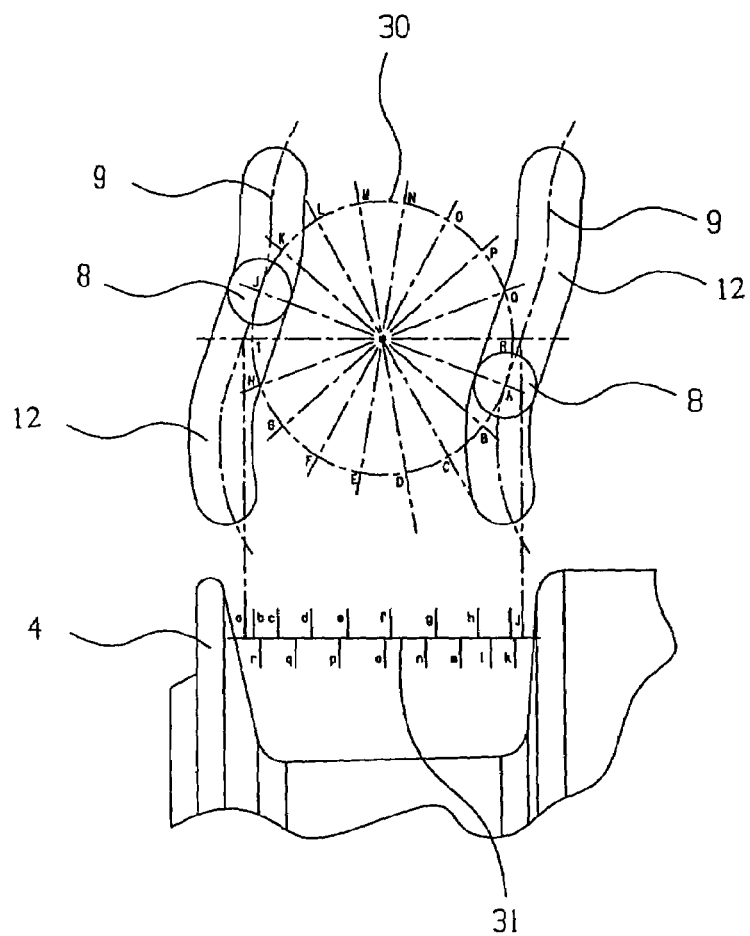
FIG. 4 is a schematic representation of the pole location in one cycle and the corresponding oscillation displacement of the spool illustrating an operational relationship of the present invention.

FIG. 4 shows one embodiment of the invention wherein the location of he pole 8 in one cycle and the corresponding oscillation displacement of the pool 4 is depicted. The pole location is identified with the alphabetic characters to R that are separated by an equal interval of 20 degrees. A line laying position on the spool 4 corresponding to the pole location is identified with the alphabetic characters a to r along the line laying distance 31. The curved shape of portions of the slot compensates or normalizes for the non-uniform oscillation speed of the level wind bracket and therefore the spool 4. Compensation or normalization can be seen in the relatively equidistant spacing, for example, between the successive locations from a to r. This results in a more even distribution of fishing line over the spool line laying surface 31.

Figure 5:
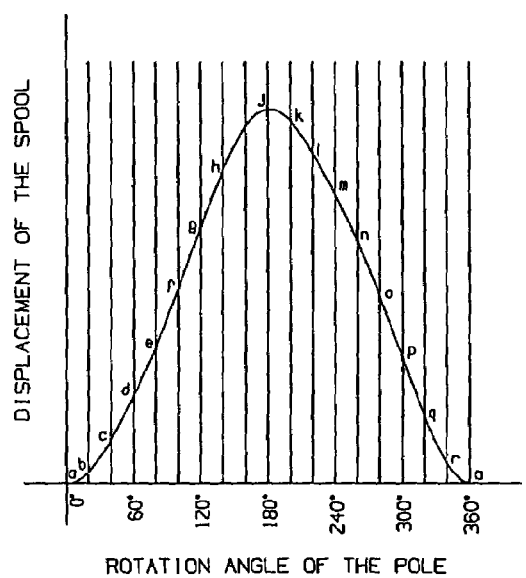
FIG. 5 is a schematic diagram of the spool motion provided by the present invention.

FIG. 5 shows a schematic diagram of the spool motion, wherein the vertical axis denotes the linear displacement along the main shaft axis 14 by the spool 4, and the horizontal axis denotes the rotation angle of the pole divided into 20° increments. One of skill in the art recognizes that the displacement of the spool along the main shaft axis 14 relative to the rotation angle of the pole is advantageous for the laying of fishing line on the spool 4.

Figure 6:
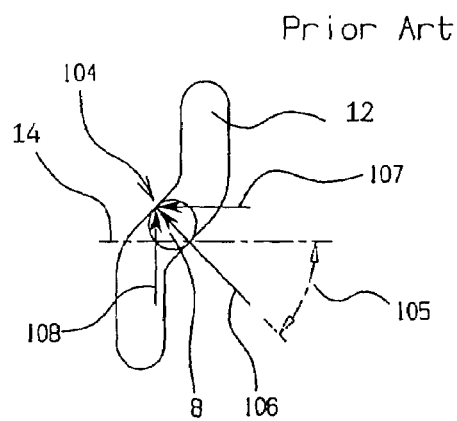
FIG. 6 is a schematic representation of a prior art guide slot configuration illustrating an inclined angle relationship.

The invention may be appreciated by reference to FIG. 6 which depicts a prior art oscillation mechanism. FIG. 6 shows a prior art mechanism that uses an inclined portion in the middle of a guide slot 12. When a pole 8 is at the inclined portion of the guide slot, a force 106 is acting onto the guide slot surface at point 104 with an inclined angle 105. The force 106 can be separated into a horizontal component 107 and a vertical component 108. As the level wind bracket is moving parallel to the main shaft axis 14 of the fishing reel, only the horizontal component 107 is usable to drive this oscillation mechanism. The vertical component 108 is extraneous to the intended operation, and is dissipated as a frictional force or as the causation for the felt wobble or jiggle associated with the prior art oscillation mechanism. It can be concluded that a large magnitude of component 107 but with a small magnitude of component 108 is desired, i.e. a small value of inclined angle 105.

Figure 7:
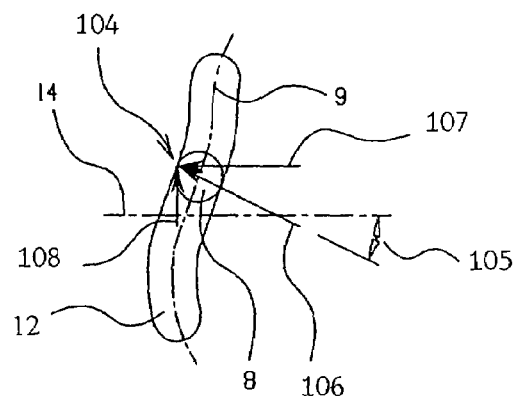
FIG. 7 is a schematic representation of a guide slot configuration illustrating an inclined angle relationship corresponding to the representation of FIG. 6 for an embodiment of the invention.

In one embodiment of the invention, for example in FIG. 7, the corresponding inclined angle 105 is much smaller that the prior art inclined angle 105. This results in a reduced frictional force and wobbling or jiggling effect.

Figure 8:
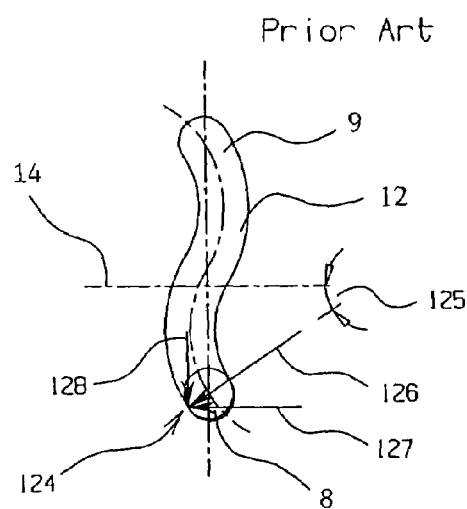
FIG. 8 is a schematic representation of a prior art guide slot configuration illustrating an inclined angle relationship.

The invention may be further appreciated by reference to FIG. 8, which also depicts a prior art oscillation mechanism. Similar to the prior art shown in FIG. 6, the main shaft axis 14 of the fishing reel is shown. A force 126 is acting onto the guide slot surface at point 124 with an inclined angle 125. The force 126 can be separated into a horizontal component 127 and a vertical component 128. As the level wind bracket is moving parallel to the main shaft axis 14 of the fishing reel, only the horizontal component 127 is usable to drive this oscillation mechanism. The vertical component 128 is dissipated as a frictional force or is causing jiggle to the oscillation mechanism. A small inclined angle 125 is desired.

Figure 9:
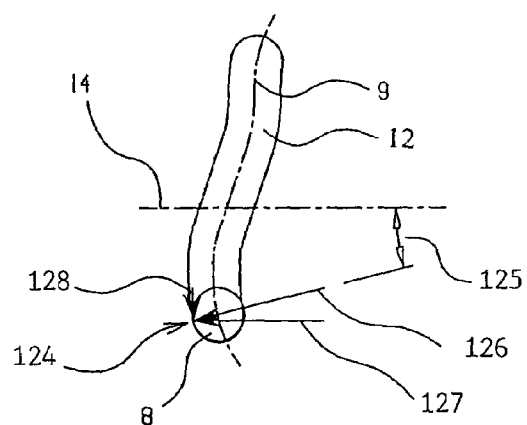
FIG. 9 is a schematic representation of a guide slot configuration illustrating an inclined angle relationship corresponding to the representation of FIG. 8, for an embodiment of the invention.

In one embodiment of the invention, for example as in FIG. 9, the corresponding inclined angle 125 is much smaller that the prior art inclined angle 125. This results in a reduced frictional force and wobbling or jiggling effect.

While the preferred embodiments have been shown to describe the invention, various modifications and substitutions may be made thereto without departing from the spirit and scope of the invention. Accordingly, it is to be understood that the present invention has been described by way of illustration and not limitation.

What is claimed is:

1. A fishing reel comprising:
   a body;
   an oscillation mechanism at least partially encased by said body, said oscillation mechanism including an oscillation gear with a rotational axis and a pole, said oscillation gear at least partially supported by the body;
   a level wind bracket having a top and a bottom surface;
   a guide slot having a functional area for receiving said pole for sliding engagement therein, said guide slot traversing the bottom surface of the level wind bracket and having a curving portion with at least two counter-curving sections intermediate curved opposing end portions, said curved end portions being relatively oriented in a uniform direction; and
   a drive pear at least partially supported by the body and in mechanical communication with the oscillation gear, wherein the curved end portions are oriented in a direction toward a spool.

2. The fishing reel of claim 1, wherein the spool is configured for storing fishing line.

3. A fishing reel comprising:
   a body;
   an oscillation mechanism at least partially encased by said body, said oscillation mechanism including an oscillation gear with a rotational axis and a pole, said oscillation gear at least partially supported by the body;

a level wind bracket having a top and a bottom surface;

a guide slot having a functional area for receiving said pole for sliding engagement therein, said guide slot traversing the bottom surface of the level wind bracket and having a curving portion with at least two counter-curving sections intermediate curved opposing end portions, said curved end portions being relatively oriented in a uniform direction; and a drive gear at least partially supported by the body and in mechanical communication with the oscillation gear, wherein the curved end portions are oriented in a direction away from a spool.

4. The fishing reel of claim 1, wherein the guide slot has a centerline that traverses the bottom surface of the level wind bracket in a non-linear path.

* * * * *